(12) United States Patent
Courteville et al.

(10) Patent No.: US 12,163,777 B2
(45) Date of Patent: Dec. 10, 2024

(54) DEVICE AND METHOD FOR IMAGING AND INTERFEROMETRY MEASUREMENTS

(71) Applicant: FOGALE NANOTECH, Nîmes (FR)

(72) Inventors: Alain Courteville, Congenies (FR);
Gilles Fresquet, Garrigues Sainte Eulalie (FR)

(73) Assignee: FOGALE NANOTECH, Nîmes (FR)

( * ) Notice: Subject to any disclaimer, the term of this patent is extended or adjusted under 35 U.S.C. 154(b) by 310 days.

(21) Appl. No.: 17/754,397

(22) PCT Filed: Sep. 21, 2020

(86) PCT No.: PCT/EP2020/076289
§ 371 (c)(1),
(2) Date: Mar. 31, 2022

(87) PCT Pub. No.: WO2021/069199
PCT Pub. Date: Apr. 15, 2021

(65) Prior Publication Data
US 2022/0397392 A1 Dec. 15, 2022

(30) Foreign Application Priority Data
Oct. 7, 2019 (FR) ...................................... 1911062

(51) Int. Cl.
*G01B 11/30* (2006.01)
*G01B 9/02001* (2022.01)
(Continued)

(52) U.S. Cl.
CPC .......... *G01B 11/30* (2013.01); *G01B 9/02007* (2013.01); *G01B 9/0203* (2013.01);
(Continued)

(58) Field of Classification Search
CPC .. G01B 11/30; G01B 9/02007; G01B 9/0203; G01B 9/02032; G01B 9/0209;
(Continued)

(56) References Cited

U.S. PATENT DOCUMENTS 9,719,777 B1 8/2017 Colonna De Lega
2006/0215172 A1* 9/2006 Abe .................... G01B 9/02014
356/497

(Continued)

FOREIGN PATENT DOCUMENTS

EP 1705456 A1 9/2006
EP 2463616 A1 6/2012

OTHER PUBLICATIONS

French Search Report received for Applicaiton No. 1911062, dated Jun. 30, 2020.

(Continued)

*Primary Examiner* — Dominic J Bologna
(74) *Attorney, Agent, or Firm* — Greer, Burns & Crain, Ltd

(57) ABSTRACT

A device and method for measuring a surface of an object, including at least one light source, at least one optical sensor, and an interferometry device having a measurement arm and a reference arm, the former directing light from each light source towards the surface of the object and directing light from the surface towards each optical sensor; the measurement device, in an interferometry configuration, illuminating the reference arm and the measurement arm with each light source and directing the light from the measurement arm and the reference arm towards each optical sensor to form an interference signal; the measurement device, in an imaging configuration illuminating at least the measurement arm and directing the light from the measurement arm towards the optical sensor to form an image of the surface; the measurement device including a digital processor pro- (Continued)

ducing, from the interference signal and the image, information on the surface.

17 Claims, 4 Drawing Sheets

(51) Int. Cl.
| | |
|---|---|
| *G01B 9/02015* | (2022.01) |
| *G01B 9/0209* | (2022.01) |
| *G01B 11/24* | (2006.01) |
| *G01H 9/00* | (2006.01) |
| *G03H 1/00* | (2006.01) |
| *G03H 1/04* | (2006.01) |
| *G03H 1/08* | (2006.01) |

(52) U.S. Cl.
CPC ....... *G01B 9/02032* (2013.01); *G01B 9/0209* (2013.01); *G01B 11/2441* (2013.01); *G01H 9/00* (2013.01); *G03H 1/0005* (2013.01); *G03H 1/0443* (2013.01); *G01B 2290/70* (2013.01); *G03H 2001/0033* (2013.01); *G03H 2001/0445* (2013.01); *G03H 2001/0452* (2013.01); *G03H 1/0866* (2013.01); *G03H 2222/45* (2013.01)

(58) Field of Classification Search
CPC .. G01B 11/2441; G01B 2290/70; G01H 9/00; G03H 1/0005; G03H 1/0443; G03H 1/0866; G03H 2001/0033; G03H 2001/0445; G03H 2001/0452; G03H 2222/45

See application file for complete search history.

(56) References Cited

U.S. PATENT DOCUMENTS

| | | | |
|---|---|---|---|
| 2012/0120485 A1* | 5/2012 | Ootomo | G02B 21/0016 356/498 |
| 2014/0226150 A1* | 8/2014 | Colonna de Lega | G01B 9/02087 356/73 |

OTHER PUBLICATIONS

Montfort F., et al., "Digital Holography Microscopy (DHM) operating in pulsed stroboscopic mode: a versatile metrology instrument for micro and nano technology," Proc of PSIE, vol. 6716, 2007, pp. 671605-1 to 671605-7.
Petitgrand, S., et al., "Simultaneous mapping of out-of-plane and in-plane vibrations of MEMS with (sub) nanometer resolution," J. Micromech. Microeng. 14, 2004, pp. S97-S101.
Rembe, C., et al., "Measurement System for Full Three-Dimensional Motion Characterization of MEMS," Journal of Microelectromechanical Systems, vol. 11, No. 5, 2002, pp. 479-488.
International Search Report and Written Opinion received for PCT/EP2020/076289, mailed Dec. 15, 2020.

* cited by examiner

DEVICE AND METHOD FOR IMAGING AND INTERFEROMETRY MEASUREMENTS

BACKGROUND

The present invention relates to a device for carrying out combined full-field imaging and interferometry measurements of an object. It also relates to a method for combined imaging and interferometry measurements.

The field of the invention is non-limitatively that of the full-field interferometric optical systems for measurements of shapes and surfaces of objects.

Different types of full-field interferometric sensors are known for measuring shapes of surfaces or layers on objects.

This type of sensor implements an optical measurement beam that interacts with the object and a reference optical beam that are recombined on a sensor such as a camera to produce interference signals. They are called "full-field" when the object is imaged on the camera according to a field of view. Processing the interference signals makes it possible to reconstruct a phase profile or a shape of the object according to the field of view. The images obtained on the camera under these conditions are a mixture of object image and interference fringes.

It is sometimes desirable to obtain, in parallel with the interference signals, a good quality image of the object: i.e., without the interference fringes.

An example of a full-field interferometric device for carrying out measurements of surface shape is described in the document US 2014/0226150. This device also comprises an external light source for illuminating the sample, so as to acquire images in interference fringes. However, these images are necessarily acquired in dark field, with non-specular lighting.

Another example of a full-field interferometric device for carrying out measurements of surface shape is described in the document U.S. Pat. No. 9,719,777 B1. This device implements a modulation of the optical field to scramble the interference fringes or position the interferometer outside the coherence zone of the source (which is broad-spectrum in this case), so as to allow the acquisition of images without interference fringes. However, in this case light still returns from the reference arm of the interferometer onto the camera, which degrades the quality of the acquired images.

SUMMARY

A purpose of the present invention is to overcome the drawbacks of the devices and methods of the prior art.

A particular purpose of the invention is to propose a device and a method allowing the acquisition of images and interferometric signals of an object.

Another purpose of the invention is to propose a device and a method allowing the acquisition of images and interferometric signals on an object, under optimal conditions for both imaging and for interferometric signals.

Yet another purpose of the present invention is to propose a device and a method allowing the acquisition of images and interferometric signals on an object, under conditions of illumination and imaging that are similar in the two modes.

At least one of these purposes is achieved with a device for measuring a surface of an object, the device comprising:
  at least one light source;
  at least one optical sensor; and
  an interferometric device having a measurement arm and a reference arm, the measurement arm being configured to direct the light coming from the at least one light source towards the surface to be measured of the object via a focusing optical system and to direct the light coming from the surface to be measured towards the at least one optical sensor.

The measurement device is configured, in a first configuration called interferometry configuration, to illuminate the reference arm and the measurement arm with the at least one light source and to direct the light coming from the measurement arm and from the reference arm towards the at least one optical sensor, so as to form an interference signal.

The measurement device is configured, in a second configuration called imaging configuration, to illuminate at least the measurement arm and to direct the light coming from the measurement arm only towards the at least one optical sensor, so as to form an image of the surface of the object.

The device also comprises digital processing means configured to produce, based on the interference signal and on the image, an item of information on the surface of the object.

Within the framework of the present invention, an "object" can denote any type of object, in particular mechanical, electronic or optical. It can thus for example denote, non-limitatively, a lens, a slide, or an assembly of lenses and/or other optical components such as an objective, a microelectronic element or circuit, a micro-electromechanical system (MEMS) or micro-opto-electromechanical system (MOEMS). The measurements make it possible to determine, for example, shapes, topologies or movements, such as vibrations, of a surface of the object. The surface to be measured can be an outer surface of the object, or an "embedded" surface, located between other surfaces of the object. This surface can also be an interface between two layers or two structures of the object.

The measurements are carried out by a device capable of operating in an interferometry configuration and in an imaging configuration.

In the interferometry configuration, an interference signal is detected between a measurement beam coming from the surface to be measured and a reference beam. This interference signal, in full field, is obtained when the measurement and reference arms of the interferometric device are illuminated by the same light source and configured so that the difference in optical paths of the respective beams incident on the optical sensor is less than the coherence length of the source.

In the imaging configuration, an image of the surface of the object is acquired by capturing the measurement beam coming from the surface. The interference and imaging measurements are carried out according to a field of view determined by the measurement means of the device. The measurements are carried out in full field mode.

The conditions of illumination of the object and of acquisition of the images and of the interference signals are similar. In the two configurations of the measurement device, the object is illuminated in the same way by the light of the measurement arm and via the same focusing optical system, in light field mode. Similarly, in the two configurations, the measurement beam coming from the surface of the object is acquired via this same focusing optical system.

This arrangement of the device allows optimum correspondence between the interference signals and the images. This correspondence allows their combined use for carrying out a more complete characterization of the object.

In general terms, the images supplied by the imaging and the interference signals supplied by the interferometry are complementary.

On the one hand, the interference signals provide a measurement of the shape or height of the surface in question.

On the other hand, the images provide an item of in-plane information of the surface of the object that is more accurate and more complete, in monochrome or colour, with respect to interferometry. Even if the interference signals also make it possible to obtain items of intensity information, these items of information are severely degraded by the presence of the artefacts associated with the interference fringes and with the phase unwrapping conditions, in particular around height transitions of the measured surface of the object. The images can be utilized by implementing image analysis techniques, for example to segment zones, identify materials or elements of the image, or measure lateral dimensions accurately.

Moreover, the achievable lateral resolution can be very different according to the type of interferometry implemented, and in particular when an off-axis interferometry configuration is used with measurement and reference beams incident on the sensor with a non-zero angle. Even if this configuration allows efficient detection in the Fourier domain, it has the drawback that as the information is encoded as a modulation of a pattern of interference fringes in the interference image, the lateral resolution depends on the periodicity of these fringes, and is therefore markedly lower than the resolution of the sensor used.

According to an embodiment that is in no way limitative, the measurement device according to the invention also comprises means for toggling between the imaging configuration and the interferometry configuration.

The toggle means can comprise a blocking element for blocking or preventing the transmission of light in the reference arm of the interferometric device. Thus the reference arm is not illuminated by the at least one light source in the imaging configuration. This blocking element can be for example a mechanical or electrooptical shutter, or a means for modifying for example an alignment of an element such as a mirror of the reference arm.

The measurement device according to the invention can comprise a first light source arranged for illuminating the measurement arm and the reference arm of the interferometric device.

According to an advantageous embodiment, the measurement device according to the invention can comprise two light sources.

In particular, it can comprise a second light source arranged to illuminate only the measurement arm of the interferometric device.

In this case, the first light source can be used when the device is in the interferometry configuration, and the second light source can be used when the device is in the imaging configuration.

Advantageously, the spectral and/or polarization properties of the light emitted respectively by the first and the second light source can be different, or vary from one light source to the other.

This makes it possible to differentiate the light detected in the interferometry configuration from that detected in the imaging configuration.

Also, in this case, the first light source and the second light source can be used simultaneously.

Alternatively, the two light sources can also be used sequentially.

According to an embodiment that is in no way limitative, the measurement device according to the invention can comprise two optical sensors.

In this case, the first optical sensor can be configured to detect the light from the first light source (in the interferometry configuration), and the second optical sensor can be configured to detect the light from the second light source (in the imaging configuration).

To this end, the first and second optical sensors can comprise, or be positioned downstream of, spectral filters or polarizing elements adapted for separating the light originating respectively from the first and second light sources.

The at least one optical sensor can comprise an array sensor (for example of the CMOS or CCD type), monochrome or colour.

According to an embodiment, a colour sensor can be used to simultaneously acquire the light from a first light source in the interferometry configuration, and from a second light source in the imaging configuration. To this end, two light sources are implemented with distinct spectral content, and a colour sensor with for example spectral filters positioned on the pixels so as to selectively detect on certain pixels the light from the first source and on other pixels the light from the second source. It is thus possible to separate at the output of the sensor the interference signal and the image.

According to an advantageous embodiment, the measurement device can also comprise positioning means configured for relative positioning of a conjugate object plane of an image plane of the at least one optical sensor at the level of the surface to be measured of the object.

In fact, it is possible to vary the focusing distance of the light in the measurement arm, and/or the position of the surface to be measured, so as to position the surface of the object in the conjugate object plane of the optical sensor or sensors. This makes it possible in particular to optimize the conditions of imaging the surface of the object, and/or the optical power coupled back into the sensor. Furthermore, the positioning of the object to be measured in the conjugate object plane of the sensor makes it possible to more easily reconstruct the surface to be measured, based on the interference signal, avoiding in particular optical aberrations caused by the effect of defocusing.

Advantageously, the interferometric device can comprise a full-field interferometer, configured to detect a full-field interference signal in a field of view.

In this case, the surface to be measured can be imaged according to the field of view in a single measurement.

According to an example, the interferometric device can comprise a Michelson interferometer with measurement and reference arms operating in reflection.

According to another example, the interferometric device can comprise a Mach-Zehnder interferometer with measurement and reference arms operating globally in transmission.

According to another aspect of the invention, a method is proposed for measuring a surface of an object, the method being implemented by a measurement device comprising:
at least one light source;
at least one optical sensor;
an interferometric device having a measurement arm and a reference arm, the measurement arm being configured to direct the light coming from the at least one light source towards the surface to be measured of the object via a focusing optical system and to direct the light coming from the surface to be measured towards the at least one optical sensor;
the measurement method comprising the following steps:
measuring the surface in a first configuration of the device, called interferometry configuration, by lighting the reference arm and the measurement arm with the at least one light source and detecting, by the at least one optical sensor, the light coming from the measurement arm and from the reference arm, so as to produce an interference signal;

measuring the surface in a second configuration of the device, called imaging configuration, by lighting at least the measurement arm and detecting, by the at least one optical sensor, the light originating only from the measurement arm, so as to form an image of the surface to be measured; and processing the interference signal and the image by digital processing means, so as to obtain an item of information on the surface to be measured.

The method according to the invention allows the acquisition and processing of images and of interference signals. It allows in particular combined use of the images and of the interference signals obtained, in order to deduce therefrom items of information on the object. It is thus possible to combine items of information coming from the imaging and interferometry measurements, to produce more complete items of information on the object.

According to an embodiment that is in no way limitative, the surface measurements in the interferometry and imaging configurations can be carried out simultaneously. This can in particular be carried out by implementing two light sources and two optical sensors, or a colour optical sensor, as described above.

The acquisition in parallel of interference signals and images is in particular well adapted to carrying out measurements dynamically, on an object in movement.

Alternatively, the surface measurements in the interferometry and imaging configurations can be carried out sequentially.

Advantageously, the method according to the invention can comprise:

determining a position of the surface to be measured relative to a conjugate object plane of the at least one optical sensor, based on a measurement of said surface in the imaging configuration;

using said previously determined position of the surface to be measured during a measurement of the surface in the interferometry configuration.

It is thus possible to position the surface to be measured precisely in a conjugate object plane, or close to and at a known distance from such a plane, in the imaging configuration without being affected by the interference fringes. It is then possible to use this item of information to improve the measurement conditions and performance in the interferometry configuration.

In fact, in order to carry out profile measurements of a surface of an object with an interferometric device, it is necessary for two conditions to be satisfied:

the surface must be positioned in a conjugate object plane of the sensor or the detector, in the direction of imaging, or close to such a plane so that there is sufficient light reflected by the surface to allow a measurement;

the optical path difference between the measurement beam reflected by the surface and the reference beam coming from the reference arm is less than the coherence length of the source, to allow the appearance of interference fringes on the detector.

These two conditions are not necessarily satisfied simultaneously, and can depend on different balance conditions of the interferometer, in particular when the measurement beam passes through layers of material or refractive surfaces before reaching the surface to be measured. It may then be necessary to adjust separately the position of the conjugate object plane and the difference in the optical path between the measurement and reference beams. This also has the result that it is not possible, in general, to use the interference fringes to determine a conjugate object plane, although they have a significant impact on the quality of the interferometric image.

Moreover, when the surface to be measured is not positioned in the conjugate object plane of the detector, the measurements of shape produce an incorrect result because they incorporate the effects of propagation of the light wave between the conjugate object plane of the detector and the surface to be measured. For example, these propagation effects can appear, for measurements of surface shape, in the form of errors of estimation of the global shape or of the real curvatures of these shapes.

Thus an additional item of information making it possible to distinguish the items of information of real shape of the surface to be measured and the effects of propagation, taking account of the position of this surface with respect to the conjugate plane of the detector, can make it possible to construct an error-free measurement of the surface and/or to verify that this measurement does not include any errors due to the effects of propagation.

It is therefore necessary to locate this conjugate plane precisely, either to position the surface of the object precisely in this plane, or to propagate by calculation the electromagnetic field detected on the sensor by interferometry in the conjugate image plane of the surface to be measured. In all cases, it is important to be able to have knowledge of and/or to validate the position of the surface of the object with respect to the conjugate plane of the detector in order to be able to utilize a measurement obtained in the interferometry configuration, taking account of this position. It is thus possible to use this item of position information of the surface of the object with respect to the conjugate plane of the detector, to determine the shape of the surface with greater accuracy.

By virtue of the method according to the invention, it is possible to use the imaging, undisturbed by the interference fringes, to determine the position for which the conjugate object plane of the sensor is positioned at the level of the surface to be measured, and to place the conjugate object plane of the sensor at the level of this surface.

It is then possible to optimize the visibility of the interference fringes by varying the difference in optical paths between the measurement and reference beams, and to acquire and process interference signals in order to deduce therefrom an item of information, in particular of shape, of the surface of the object.

Alternatively, it is possible to carry out the measurements in interferometry configuration with the object positioned outside the conjugate object plane of the sensor. This makes it possible to have slower phase variations in the field of view, in the case of implementation of an off-axis interferometry technique.

By virtue of knowledge of the position of the conjugate object plane of the sensor, the electromagnetic field is digitally propagated over a known distance to the position of the conjugate image plane of the measured surface, to obtain an item of surface profile information. By virtue of the images acquired in imaging configuration, the position of this conjugate image plane of the surface (or of the conjugate object plane of the detector) is known with accuracy, even in the presence of diffractive structures.

According to an embodiment that is in no way limitative, the processing of the interference signal can be carried out by an analysis by profilometry of a plurality of interferograms acquired for one and the same surface to be measured.

Profilometry is based on processing sequences of interferograms acquired for a plurality of optical path differences in the interferometric device, and which constitute the interference signal. These sequences can be acquired in different ways according to the analysis technique implemented.

The plurality of interferograms can in particular be acquired according to a phase-shifting interferometric method or according to a vertical scanning interferometric method.

According to another embodiment that is in no way limitative, the processing of the interference signal can implement a calculation method using digital holography.

An interference signal or interferogram is recorded. Then a digital holography method is used to digitally reconstruct the surface in question, by simulating the process of illuminating the interferogram on the detector with a digital reference wave. Such a method has the advantage of only requiring a single image or interference signal acquisition in order to calculate the shape of an optical surface.

According to embodiments, the method according to the invention can comprise a step of obtaining an item of information on the surface to be measured, combining an item of greyscale and/or colour intensity information obtained in imaging configuration and an item of shape and/or profile information obtained in interferometry configuration.

A more complete representation of the object can then be obtained.

The method according to the invention can be implemented to measure the shapes and/or the positions of surfaces or interfaces of an object as described above. It is also particularly suitable for vibrometry measurements, so as to gain knowledge of the vibrations of an object such as a MEMS in the field of view. The vibrations in the object plane can be deduced from the images, and the out-of-plane vibrations can be deduced from the interference signals.

According to embodiments, the method according to the invention can thus comprise a step of obtaining an item of information of displacement or of vibration of the surface to be measured, comprising obtaining an item of information of in-plane displacement or of vibration of this surface based on images in imaging configuration, and obtaining an item of information of out-of-plane displacement or vibration of this surface based on interference signals in interferometry configuration.

BRIEF DESCRIPTION OF THE DRAWINGS

Other advantages and characteristics will become apparent on examining the detailed description of examples that are in no way limitative, and from the attached drawings, in which.

DETAILED DESCRIPTION

It is well understood that the embodiments that will be described hereinafter are in no way limitative. Variants of the invention can be envisaged in particular comprising only a selection of the characteristics described hereinafter, in isolation from the other characteristics described, if this selection of characteristics is sufficient to confer a technical advantage or to differentiate the invention with respect to the state of the prior art. This selection comprises at least one, preferably functional, characteristic without structural details, or with only a part of the structural details if this part alone is sufficient to confer a technical advantage or to differentiate the invention with respect to the state of the prior art.

In particular, all the variants and all the embodiments described can be combined together if there is no objection to this combination from a technical point of view.

In the figures, elements common to several figures may retain the same reference.

The measurement device according to the present invention is arranged to carry out measurements of a surface to be measured of an object, such as an optical element.

The device comprises at least one light source, at least one optical sensor or detector and an interferometric device having a measurement arm and a reference arm. The at least one source is preferably a low-coherence source, the light of which is directed towards the surface to be measured via a focusing optical system, such as an objective. The light coming from the surface to be measured is directed towards the at least one optical sensor.

The measurement device can be configured in an interferometry configuration and an imaging configuration.

In the interferometry configuration, the reference arm and the measurement arm and the reference arm of the interferometer are illuminated, and the light coming from the measurement arm is directed towards the at least one detector to produce therein an interference signal between the measurement beam reflected by the surface to be measured and the reference beam coming from the reference arm.

In the imaging configuration, at least the measurement arm of the interferometer is illuminated, and the light coming from the measurement arm only is directed towards the at least one optical sensor to produce therein an image of the surface to be measured.

The measurement device also comprises digital processing means. These processing means are configured to produce, based on the measured interference signal and the image, an item of information on the surface to be measured according to a field of view. These processing means comprise at least a computer, a central processing or calculation unit, a microprocessor, and/or suitable software means.

In FIGS. 1 to 6, embodiments of the measurement device according to the invention are represented diagrammatically. The processing means are not shown therein.

Figure 1:
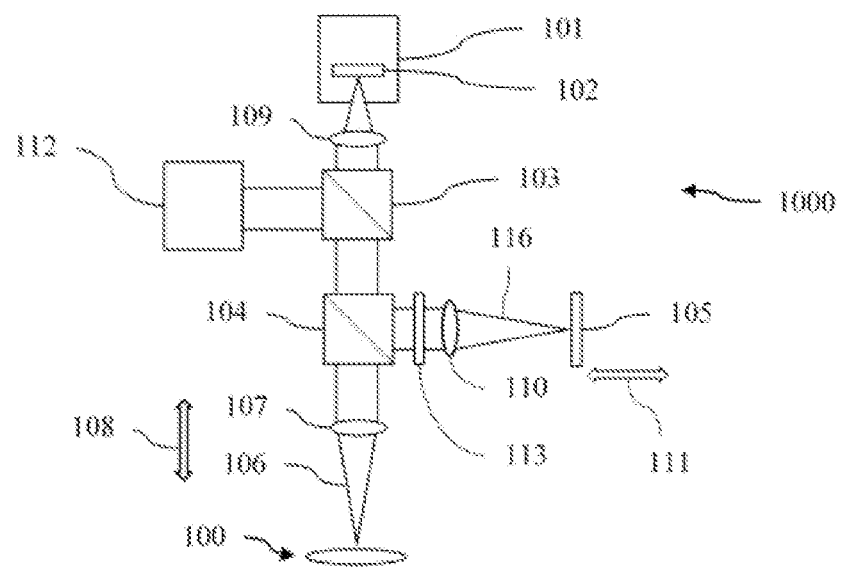
FIG. 1 is a diagrammatic representation of a measurement device according to a first embodiment of the present invention.

FIG. 1 is a diagrammatic representation of a measurement device according to a first embodiment of the invention.

The measurement device 1000 comprises a full-field low-coherence interferometric device of the Michelson or Linnik type. The interferometer is formed by a separator element 104, for example in the form of a cube or of a beam splitter, with a measurement arm that directs a measurement beam 106 towards a surface to be measured of an object 100, and a reference arm with a mirror 105 to shape a reference beam 116.

The interferometer is illuminated by a light source 112 via a light separator element 103, for example in the form of a cube or a beam splitter. Depending on the modes of detection implemented, the source 112 can be a low-coherence source, with a coherence length of the order of a few microns or a few tens of microns for example, or more coherent, with a coherence length of several hundred microns or more. It can in particular comprise, for example, a superluminescent diode (SLD), a laser diode, a thermal light source (halogen lamp etc.) or a supercontinuum source. It can also comprise a filtering device, for example with a grating and a slit, or interference filters, for adjusting the coherence length according to need. It can be arranged to emit in visible or near infrared wavelengths, around one or more wavelengths.

Of course, the separator elements 103, 104 can be non-polarizing, or polarizing and associated with quarter-wave splitters to make lossless couplers. The measurement 106 and reference 116 beams, reflected respectively in the two arms of the interferometer, are directed via the light separator plate 103 to a camera 101 with a sensor or a detector 102 comprising a detection array, for example of the CMOS or CCD type.

When the difference in optical paths between the measurement and reference beams is less than the coherence length of the source 112, interferences are obtained on the detector 102.

The device 1000 according to the embodiment shown in FIG. 1 also comprises a focusing lens or objective 107, and a tube lens 109, arranged so as to define a conjugate object plane of an image plane formed on the sensor 102. The reference arm also comprises an objective 110 which also defines, with the tube lens 109, a reference conjugate object plane of the image plane of the detector 102.

The device 1000 is a full-field imaging device, which makes it possible to image surfaces or interfaces of the object to be measured 100 on the detector 102.

In standard fashion, the device 1000 comprises optical elements for focusing the illumination beam in the rear focal plane of the focusing objective 107 and of the objective 110 of the reference arm. The illumination beams are not shown in the figure for reasons of clarity.

The device 1000 also comprises a displacement means 108 the function of which is to displace the conjugate object plane of the image plane formed by the detector 102, so as for example to image the surfaces or interfaces of the object on the detector 102. This displacement means 108 can comprise a system for displacing the focusing objective 107 or lenses of this objective, for example with a linear or helical translation device. Alternatively or in addition, this displacement means 108 can comprise a device or a translation stage for displacing the device 1000 with respect to the object to be measured 100, or vice versa.

The device 1000 can also optionally comprise a displacement means 111 for varying the length of the reference arm, for example in the form of a translation stage 111 displacing the reference mirror 105. The objective 110 of the reference arm can also be adjustable in order to maintain the reference mirror 105 in a conjugate object plane of the image plane formed by the detector 102. This displacement means 111 makes it possible to adjust the relative difference in optical paths between the measurement arm and the reference arm of the interferometer, so as to adjust the zone of appearance of the interference fringes.

According to the embodiment shown in FIG. 1, the device 1000 also comprises a shutter 113 making it possible to interrupt the beam of the reference arm, so that this beam does not reach onto the detector 102. This shutter can be of any type, such as a mechanical shutter (diaphragm) or an electronic shutter (for example based on liquid crystals). It can also be produced with an element displacing the reference mirror 105, for example so as to put it out of alignment.

Figure 2:
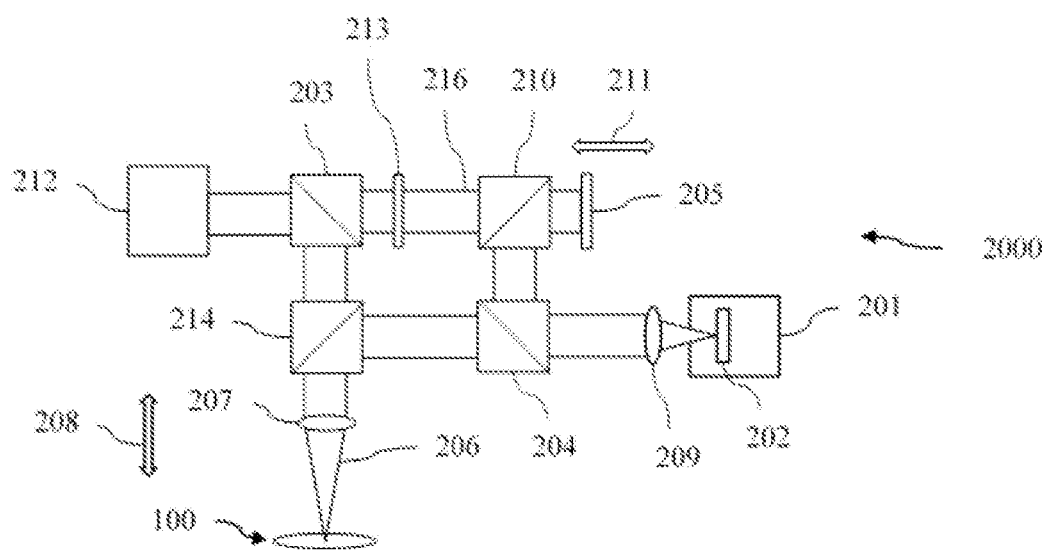
FIG. 2 is a diagrammatic representation of a measurement device according to a second embodiment of the present invention.

FIG. 2 is a diagrammatic representation of a measurement device according to a second embodiment of the invention.

The measurement device 2000 comprises a full-field low-coherence interferometric device of the Mach-Zehnder type. The interferometer comprises a measurement arm that directs a measurement beam 206 towards the surface to be measured of an object 100, and a reference arm in which a reference beam 216 propagates.

The interferometer is illuminated by a light source 212 via a light separator element 203, for example in the form of a cube or a beam splitter. Depending on the modes of detection implemented, the source 212 can be a low-coherence source, with a coherence length of the order of a few microns or a few tens of microns for example, or more coherent, with a coherence length of several hundred microns or more. It can in particular comprise, for example, a superluminescent diode (SLD), a laser diode, a thermal light source (halogen lamp etc.) or a supercontinuum source. It can also comprise a filtering device, for example with a grating and a slit, or interference filters, for adjusting the coherence length according to need. It can be arranged to emit in visible or near infrared wavelengths, around one or more wavelengths.

The light from the source 212 is separated into a measurement beam 206 and a reference beam 216 by a first separator element 203, for example in the form of a cube or a beam splitter.

The interferometer comprises a second separator element 214 in the measurement arm, for example in the form of a cube or a beam splitter, to direct the measurement beam 206 towards the object to be measured 100, and to transmit the light reflected in this object.

In the embodiment shown, the device also comprises, in the reference arm, an adjusting element for directing and varying the length of the optical path of the reference arm. This element can be produced, for example, with a separator element in the form of a cube or a beam splitter 210 and a reference mirror 205 that can be displaced in translation by translation means 211 such as a translation stage.

The measurement 206 and reference 216 beams are then combined via a separator element 204, for example in the form of a cube or a beam splitter, and directed towards a camera 201 with a sensor or a detector 202 comprising a detection array, for example of the CMOS or CCD type.

Of course, the Mach-Zehnder interferometer can be produced with elements that are non-polarizing or polarizing, and associated with quarter-wave or half-wave plates to form lossless couplers. It can also be produced, at least partially, with optical fibres.

When the difference in optical paths between the measurement and reference beams is less than the coherence length of the source 212, interferences are obtained on the detector 202.

The device also comprises a focusing lens or objective 207, and a tube lens 209, arranged so as to define a conjugate object plane of an image plane formed on the detector 202.

The device 2000 is also a full-field imaging device, which makes it possible to image surfaces or interfaces of the object to be measured 100 on the detector 202.

In standard fashion, the device 2000 comprises optical elements for focusing the illumination beam in the rear focal plane of the focusing objective 207. The illumination beams are not shown in the figure for reasons of clarity.

The device 2000 also comprises a displacement means 208 the function of which is to displace the conjugate object plane of the image plane formed by the detector 202, so as for example to image the surfaces or interfaces of the object 100 on the detector 202. This displacement means 208 can comprise a system for displacing the focusing objective 207 or lenses of this objective, for example with a linear or helical translation device. Alternatively or in addition, this displacement means 208 can comprise a device or a translation stage for displacing the device 2000 relative to the optical element 100, or vice versa.

According to the embodiment shown in FIG. 2, the device 2000 also comprises a shutter 213 making it possible to interrupt the beam of the reference arm, so that this beam does not reach onto the detector 202. This shutter can be of any type, such as for example a mechanical shutter (diaphragm) or an electronic shutter (based on liquid crystals, etc).

Figure 3:
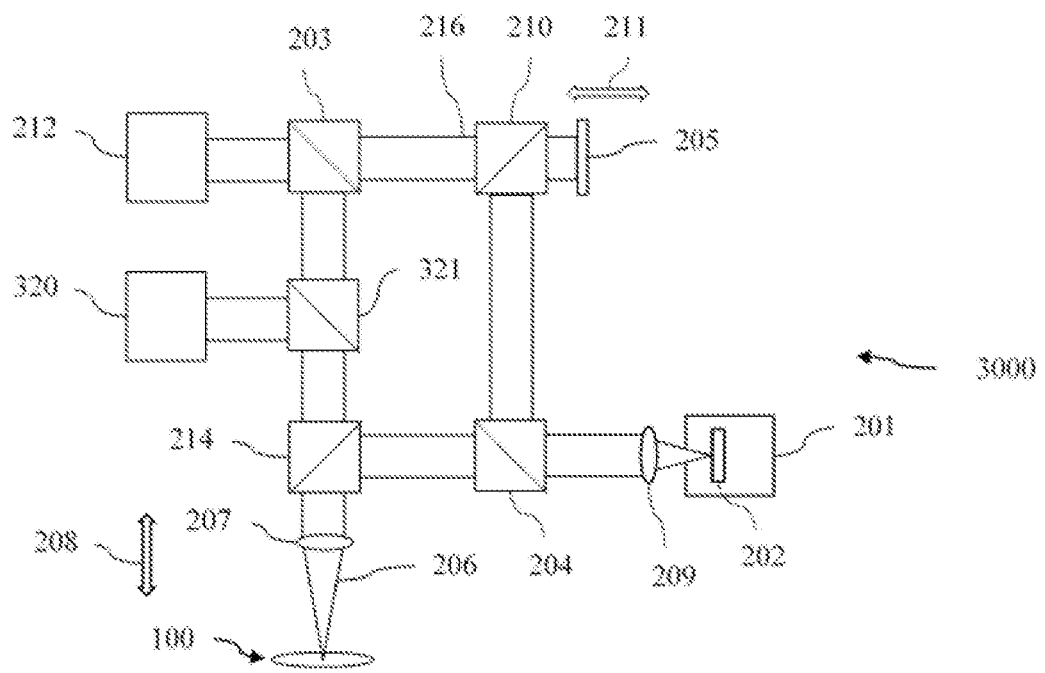
FIG. 3 is a diagrammatic representation of a measurement device according to a third embodiment of the present invention.

FIG. 3 is a diagrammatic representation of a measurement device according to a third embodiment of the invention.

The measurement device 3000 comprises a full-field low-coherence interferometric device of the Mach-Zehnder type.

The device 3000 differs from the device 2000 shown in FIG. 2 in that it comprises a second light source 320 inserted in the measurement arm via a separator element 321 in the form of a cube or a beam splitter. This second light source 320 can be identical to the first source 212, or different. It can be in particular broad-spectrum, in a spectral band similar to or comprising the spectrum of the first source 212, or different from the spectrum of the first source 212.

The beam of this second light source 320 is also focused in the rear focal plane of the focusing objective 207 (as for the first source 212), so as to illuminate the object 100 via this focusing objective 207 with a uniform illumination beam.

It should be noted that in this configuration, the second source 320 does not generate a reference beam 216. Thus, preferably, the device 3000 also differs from the device 2000 in that it does not comprise a shutter 213 making it possible to interrupt the beam of the reference arm.

According to embodiments, the first source 212 and the second source 320 can be used alternately. When the first source 212 is on and the second source 320 is off, the device allows the acquisition of interferometric measurements, in the interferometry configuration. When the first source 212 is off and the second source 320 is on, the device allows the acquisition of imaging measurements, in the imaging configuration.

According to embodiments, the first source 212 and the second source 320 can be used simultaneously, with a colour detector 202. To this end, two light sources with distinct spectral content are implemented, as well as a colour detector 202 with for example spectral filters positioned on the pixels so as to selectively detect on certain pixels the light from the first source 212 and on other pixels the light from the second source 320. It is thus possible to separate the interference and image signals at the output of the detector.

It should be noted that the interferometry measurements and the imaging measurements are acquired under the same lighting conditions of the object 100 and via the same imaging system, for optimum correspondence.

Figure 4:
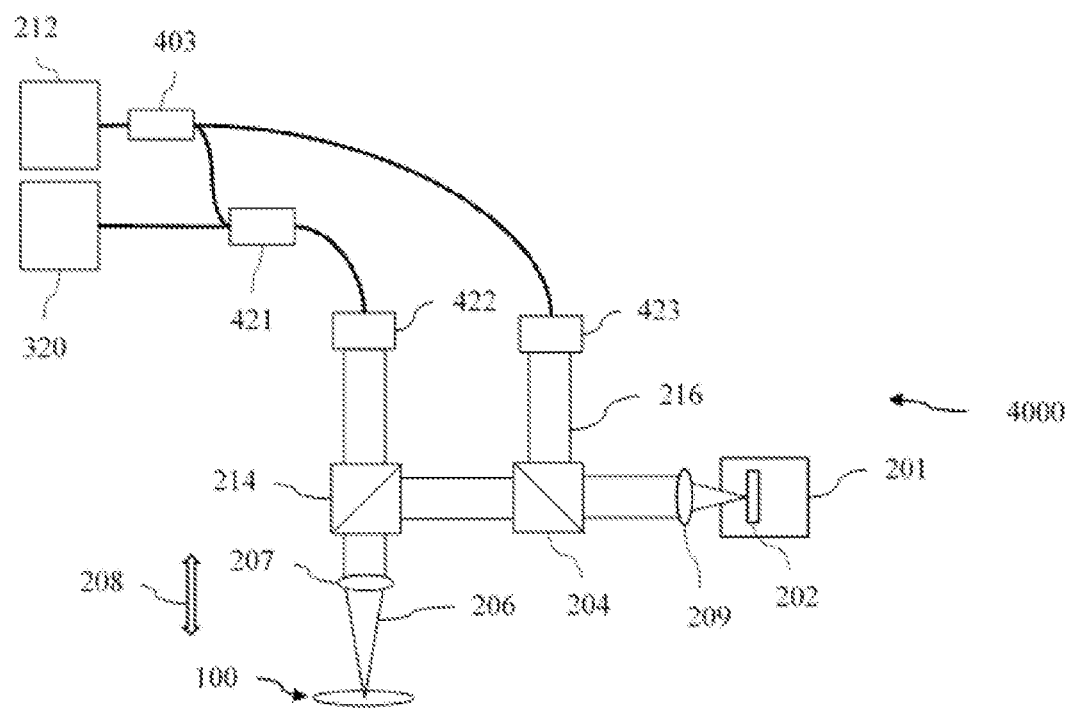
FIG. 4 is a diagrammatic representation of a measurement device according to a fourth embodiment of the present invention.

FIG. 4 is a diagrammatic representation of a measurement device according to a fourth embodiment of the invention.

The measurement device 4000 comprises a full-field low-coherence interferometric device of the Mach-Zehnder type.

The device 4000 differs from the device 3000 shown in FIG. 3 in that the first source 212 and the second source 320 are using fibre.

The first source is connected to a first fibre coupler 403 which acts as the separator element 203 of the device 3000, to generate via two optical fibres and two collimators 422 and 423, respectively, the measurement beam 206 and the reference beam 216.

The second source is inserted in the measurement arm via a second fibre coupler 421, which acts as the separator element 321 of the device 3000.

In the same way as for the device 3000, the first source 212 and the second source 320 can be used alternately, or simultaneously with a colour detector 202.

According to a variant of the device 4000, the second source can be inserted in the measurement arm via a separator element 321 in free propagation, for example in the form of a cube or a beam splitter, positioned between the collimator 422 and the separator element 214.

Figure 5:
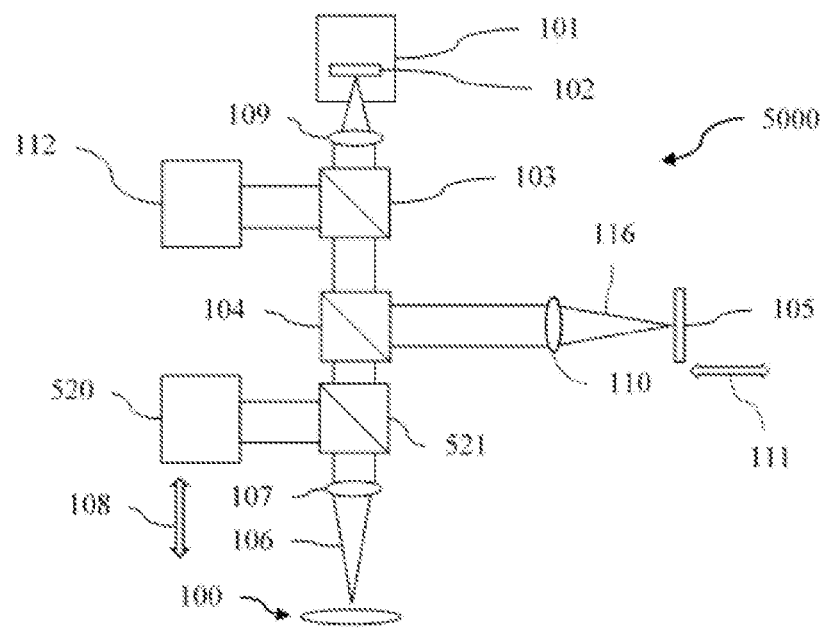
FIG. 5 is a diagrammatic representation of a measurement device according to a fifth embodiment of the present invention.

FIG. 5 is a diagrammatic representation of a measurement device according to a fifth embodiment of the invention.

The measurement device 5000 comprises a full-field low-coherence interferometric device of the Michelson type.

The device 5000 differs from the device 1000 shown in FIG. 1 in that it comprises a second light source 520 inserted in the measurement arm via a separator element 521, for example in the form of a cube or a beam splitter. This separator element 521 is inserted between the separator element 104 of the Michelson interferometer and the focusing optical system 107. In this case, it is possible for the device 5000 not to comprise the shutter 113.

In the same way as for the device 3000 in FIG. 3, the first source 212 and the second source 520 can be used alternately, or simultaneously with a colour detector 102.

Figure 6:
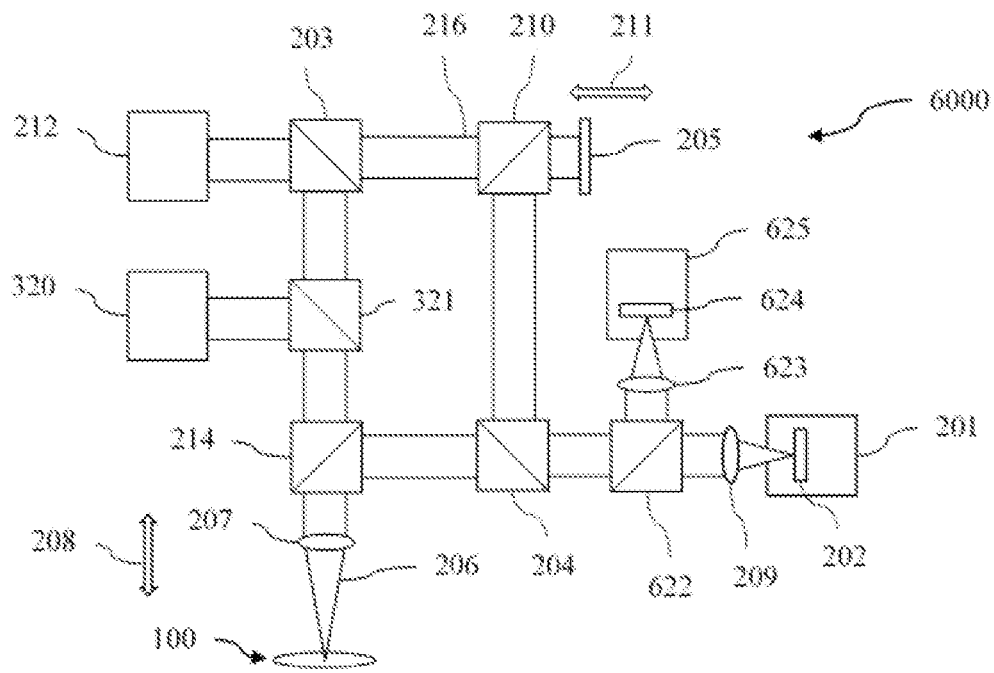
FIG. 6 is a diagrammatic representation of a measurement device according to a sixth embodiment of the present invention.

FIG. 6 is a diagrammatic representation of a measurement device according to a sixth embodiment of the invention.

The measurement device 6000 comprises a full-field low-coherence interferometric device of the Mach-Zehnder type.

The device 6000 differs from the device 3000 shown in FIG. 3 in that it comprises a second camera 625 with a detector 624 comprising a detection array, for example of the CMOS or CCD type. The device 6000 also comprises a tube lens 623, arranged so as to define with the focusing lens 207 a conjugate object plane of an image plane formed on the detector 624 of the second camera 625.

The first and second cameras and their respective tube lenses can be arranged so as to define conjugate image planes of one and the same object plane, at the level of the object 100. Moreover, the first and second cameras and their tube lenses can be identical in order to obtain an optimum correspondence of the images.

Alternatively, the first and second cameras and their respective tube lenses can be arranged so as to define conjugate image planes of distinct object planes, at the level of the object 100. These object planes can be for example offset by a known amount, to allow for example the acquisition of interferometric signals from a surface to be measured outside a conjugate image plane of this surface.

The first and the second camera are separated by a separator element 622. The separator element and the light sources are preferably arranged so that the light from each source only reaches one camera. Thus, for example, the light from the first source 212 for the interferometric mode only reaches the first camera 201, and the light from the second source 320 for the imaging mode only reaches the second camera 625. To this end, it is possible to use light sources with distinct spectra, and a dichroic separator element 622. It is also possible to use light sources with different polarizations, and a separator element 622 that is polarizing, or capable of separating polarizations.

In this embodiment, the first source 212 and the second source 320 can be used simultaneously, for simultaneous acquisition of the images and of the interferometric signals.

Alternatively, the separator element can be arranged so that the light from each source reaches the two cameras. In this case, the two cameras can be different, for example colour and monochrome, in order to acquire different items of information.

According to variants that are not shown, the devices 4000 or 5000 can also comprise a second camera 625 and a separator element 622, arranged with the first camera in the same way as for the device 6000.

The two cameras and the two light sources can be arranged in the same way and also used in the same way as has been described for the device 6000.

According to other variants that are not shown, the devices 1000 or 2000 can also comprise a second camera 625 and a separator element 622, arranged with the first camera in the same way as for the device 6000.

This can make it possible in particular to implement different cameras (colour and/or monochrome) in order to measure different properties of the signals. This can also make it possible to implement simultaneously conjugate object planes of the different detectors.

The measurement device according to the embodiments shown in FIGS. 1 to 6 can be used to implement the steps of a measurement method according to the invention which will be described hereinafter.

Figure 7:
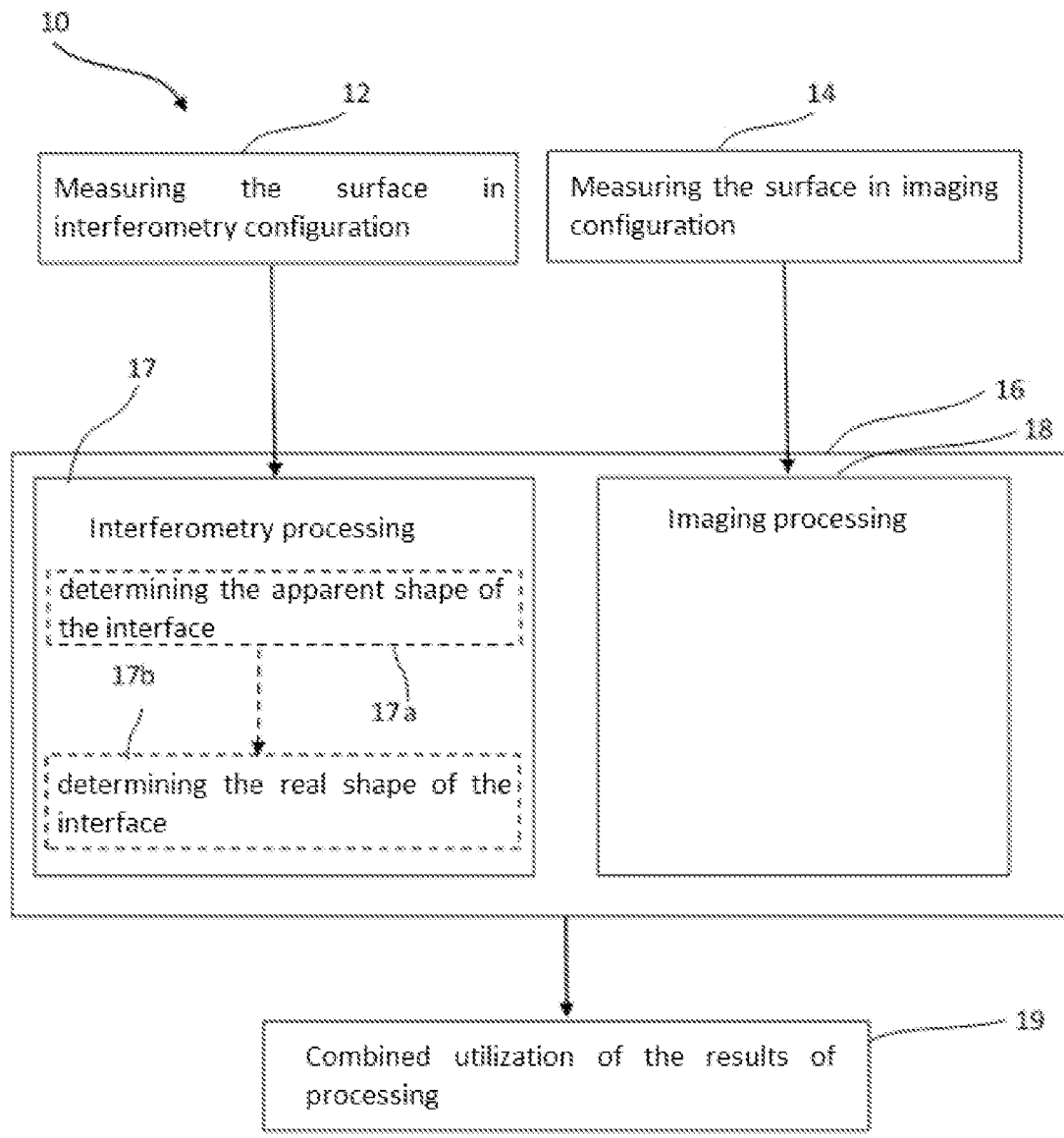
FIG. 7 is a diagrammatic representation of a non-limitative embodiment example of a measurement method according to the present invention.

FIG. 7 is a diagrammatic representation of a non-limitative embodiment example of a measurement method according to the invention.

The method 10, shown in FIG. 7, comprises a step 12 of measuring the surface to be measured by means of the measurement beam 106, 206, in the interferometry configuration.

Each of the measurement devices 1000, 2000, 3000, 4000, 5000, 6000 described above can be used to carry out the measurement of the surface in the interferometry configuration. When the measurement and reference arms of the full-field interferometric device are illuminated by the same (first) light source 112, 212, and balanced so that the difference in optical paths of the reference and measurement beams incident on the (first) camera 101, 201 is less than the coherence length of the source, a full-field interference signal is obtained on the detector 102, 202.

The method 10 also comprises a step 14 of measuring the surface to be measured by means of the measurement beam 106, 206, in the imaging configuration.

The step 14 of imaging measurement can be carried out sequentially or in parallel with the step 12 of interferometry measurement.

In particular, with the devices 1000, 2000 shown respectively in FIGS. 1 and 2, the imaging and interferometry measurements are carried out sequentially, with the shutter 113, 213 open for the interferometry measurements and closed for the imaging measurements.

With the devices 3000, 4000, 5000 shown respectively in FIGS. 3, 4 and 5, the imaging and interferometry measurements can be carried out sequentially, with the light sources on alternately. Only the first source 112, 212 is on for the interferometry measurements, while only the second source 320, 520 is on for the imaging measurements.

Alternatively, with a detector allowing a spectral separation of the sources, the light sources can be on simultaneously, and the imaging and interferometry measurements carried out simultaneously.

With the device 6000 shown in FIG. 6, the imaging and interferometry measurements are carried out sequentially or simultaneously. The two light sources 212, 320 can be on alternately or simultaneously.

The illumination of the surface to be measured 100 is carried out in the same way as in the interferometry configuration, via the focusing objective 207. Moreover, with the exception of the embodiment of the device 6000 shown in FIG. 6, acquisition of the image of the object and of the interference signal is carried out via the same imaging system and on the same camera. This makes it possible to have an optimum correspondence between the images and the interference signals. In the case of the device 6000, the same result can be obtained by adjusting and calibrating the cameras.

To obtain real geometric shapes of the surfaces or interfaces of the optical element, the optical shapes thereof must be determined beforehand, and corrected for the propagation effects as described hereinafter.

During a processing phase 16 of the method 10, the interference signal and the image obtained for a surface to be measured are processed digitally in order to deduce therefrom an item of information on this interface. The interference signal is processed in a step 17 of interferometric processing, and the image is processed during a step 18 of image processing. Processing steps 17, 18 can be carried out sequentially or in parallel.

During a first step 17a of the interferometric processing, an item of information of optical shape of the measured surface is determined. This optical shape is called "apparent" as it is affected by any interfaces and environments passed through. It is deduced from the interferometric measurements.

Different known methods can be used to determine optical and/or geometric shapes.

According to a first embodiment, profilometric methods can be used to carry out step 17a. Profilometry is based on the processing of sequences of interferograms.

In this type of method, the measurement and reference beams are preferably adjusted so as to be incident on the detector with directions of propagation essentially parallel or merged, or slightly inclined, so as to produce flat-tint or slightly modulated interferograms.

A first example of such a profilometric method implements algorithms based on phase-stepping interferometry (PSI).

To this end, a plurality of interferograms (constituting the interference signal) is acquired for a plurality of optical path or phase difference values between the measurement and reference beams, within the limit of the coherence length of the light source.

Then, the phase and optionally the amplitude at any point of the field of view 108 of the thus-constituted interference signal are determined by applying a known algorithm, such as for example the Carré algorithm, to the succession of interferograms obtained at the point in question for the different phase shifts, and by unwrapping the thus-obtained modulo $2\pi$ phase.

Thus a set of measured phase difference values $\varepsilon_m(r_d)$ are obtained in the plane of the detector (or, more precisely, phase differences between the measurement and reference beams on the detector), $r_d$ being a coordinate vector towards points of the plane of the detector in a reference system (X, Y, Z).

It is thus possible to determine the optical shape $L_m(r_d)$ of the surface with the conventional relationship:

$$L_m(r_d)=\varepsilon_m \lambda/4\pi, \quad (1)$$

with $\lambda$ the central wavelength of the source in a vacuum.

The geometric shape $S_m(r_d)$ can be deduced from the optical shape by the relationship:

$$S_m(r_d)=L_m(r_d)/n, \quad (2)$$

where n is the group refractive index of the medium in which the measurement beam is reflected.

A second example of a profilometric method implements algorithms based on vertical scanning interferometry (VSI).

To this end, a low-coherence or broad-spectrum light source is used.

A plurality of interference signals is acquired for a plurality of optical delays between the measurement and reference arms of the interferometer, in a range of optical delays preferably extending beyond the coherence length of the light source.

At each point $r_d$ of the detector, the optical delay is detected for which the optical path difference between the measurement beam reflected on the surface or the interface and the reference beam is zero. To this end, it is possible to detect for example the maximum amplitude of the envelope of the interferogram or the position where the phase of the interferogram is cancelled out. Thus the optical shape $L_m(r_d)$ of the surface is obtained directly.

According to another embodiment of step 17a, a digital holography method can be used.

In a digital holography method, also called "off-axis interferometry", the measurement and reference beams are preferably adjusted so as to be incident on the detector with inclined directions of propagation, or forming an angle between them.

To this end, a light source is used that is coherent, or that at least has a sufficiently great coherence length in the face of the optical path differences in question.

When the measurement beam reflected by a surface or interface of the object and the reference beam have an optical path difference or a delay less than the coherence length of the light source, an interference signal, or interferogram, $I_m(r_d)$, is obtained on the detector, in which the phase information is encoded in a pattern of fringes in the direction of inclination of the beams.

The interferogram on the detector can be represented by the following equation:

$$I_m(r_d)=|E_m(r_d)|^2+|E_R|^2+E_R^*E_m(r_d)+E_m^*(r_d)E_R, \quad (3)$$

with $E_m$ being the electromagnetic wave in complex notation as reflected by the surface or the interface and incident on the detector (measurement beam), $E_R$ being the reference electromagnetic wave in complex notation, assumed to be constant for the sake of simplicity, and * being the complex conjugate.

The first two terms correspond to the zero$^{th}$ order, the third and fourth terms correspond respectively to the real and virtual images.

By choosing an angle between the measurement and reference beams that is sufficiently wide, these different terms or orders of diffraction are separated in the Fourier domain and can therefore be filtered.

The term corresponding to the real image can thus be obtained by filtering in the Fourier domain by:

$$E_R^*E_m(r_d)=\text{FFT}^{-1}(\text{FFT}(I_m(r_d))M), \quad (4)$$

where FFT is the fast Fourier transform and FFT$^-$ its inverse. M is the filter applied in the frequency domain to filter the term corresponding to the real image so as to preserve the spatial frequencies present in the numerical aperture of the focusing objective.

Once the term corresponding to the real image $E_R^*E_m(r_d)$ is obtained, it is possible to illuminate it digitally with a digital reference wave $E_{RD}$ corresponding to the reference wave used, in order to obtain the expression of the sought electromagnetic field $E_m(r_d)$:

$$E_m(r_d)=E_{RD}E_R^*E_m(r_d). \quad (5)$$

It should be noted that by assuming that the reference wave is constant or uniform, this step can also be carried out in the Fourier domain by translating the filtered image to baseband (near to zero frequency).

Using the phase $\varepsilon_m(r_d)$ of the electromagnetic field $E_m(r_d)$, it is then possible to determine the optical shape $L_m(r_d)$ of the surface in question with the relationship (1), as well as the geometric shape $S_m(r_d)$ with the relationship (2).

The optical or geometric shape obtained as described above is a shape as projected on the detector. To obtain the real optical or geometric shape of the surface, it is also necessary to take account of the effect of the optical system between the surface and the detector, in a step 17b of the method 10.

When the surface is located in a conjugate object plane of the image plane of the detector, and assuming a perfect optical system, it is possible to use the magnification of the imaging system which makes a point $r_i$ in the conjugate object plane correspond to a point $r_d$ of the detector, $r_i$ being a coordinate vector towards points of the conjugate object plane in the reference system (X, Y, Z). Thus the optical $L_m(r_i)$ or geometric $S_m(r_i)$ shape of the corrected surface of the optical system is obtained, with the correct magnification.

According to an embodiment, it is possible to take account of the aberrations of the optical system. This can be done for example by calibration, by carrying out measurements on a mirror positioned in place of the object to be measured 100. It is thus possible to determine an optical shape resulting from these aberrations, which can be subtracted from the measured optical shape. It is thus also possible to take account of the phase profile of the reference beam on the detector. This makes it possible to improve the accuracy of the shape measurement carried out by the method according to the invention.

Depending on the acquisition and processing methods, and in particular by implementing a digital holography technique as described above, it is possible to obtain a complete expression (with the amplitude and the phase) of the electromagnetic field $E_m(r_d)$ at the detector. It is then possible to propagate the electromagnetic field digitally, for example towards another reconstruction plane, with known methods. Some methods use in particular the Fresnel approximation, such as for example the Fourier transform approach (Appl. Opt. 38, 6994-7001 (1999)), the angular spectra (Opt. Express 13, 9935-9940 (2005)) or convolutions (Meas. Sci. Technol. 13, R85-R101 (2002)).

For example, in the case where the detector is not exactly in a conjugate image plane of the object plane of the surface to be measured, it is possible to determine the electromagnetic field $E_m(r_d)$ in the image plane by digitally propagating the electromagnetic field measured at the detector up to this plane.

Similarly, it is possible to determine the shape of the surface more exactly by propagating the electromagnetic field from the plane of the detector up to the surface in question.

The PSI-type profilometry or digital holography algorithms have unambiguous measurement ranges limited to the wavelength. This measurement range can of course be extended using well known techniques by carrying out measurements at several wavelengths.

During image processing step 18 of the method 10 according to the invention, the images can be processed according to known techniques. They have the advantage of being unaffected by the interference signals and allow the camera resolution to be put to best use. It is then possible to implement image analysis techniques, so as for example to segment zones according to predefined criteria, identify materials or elements of the image, or measure lateral dimensions accurately.

The results of the interferometric and imaging techniques obtained during the processing phase 16 represent complementary items of information on the surface in question. Their combined use allows a more complete characterization of the surface of the object.

On the one hand, as detailed above, the interferometry signals provide a measurement of the shape or height of the surface.

On the other hand, the images provide an item of in-plane information that is more accurate and more complete than the interference signals.

It should be noted that the interferometry signals also make it possible to obtain items of intensity information. However, this information is severely degraded by the presence of the artefacts associated with the interference fringes and with the phase unwrapping conditions, in particular around the height transitions of the surface.

Moreover, the achievable lateral resolution can be very different according to the type of interferometer implemented, and in particular when an off-axis interferometry configuration is used with measurement and reference beams incident on the detector with a non-zero angle. This configuration is used in particular in digital holography, as it allows efficient detection in the Fourier domain. However, it has the drawback that as the information is encoded as a modulation of a pattern of interference fringes in the interference image, the lateral resolution depends on the periodicity of these fringes, and is therefore markedly lower than the resolution of the camera used.

Advantageously, the device and the method according to the invention allow combined utilization of the interferometry and imaging measurements.

According to the embodiment shown in FIG. 7, the method 10 according to the invention comprises a step 19 of obtaining an item of information on the surface to be measured. In order to carry out this step 19, an item of intensity information in greyscale and/or in colour obtained in imaging configuration and an item of information of shape and/or profile obtained in interferometry configuration are combined.

Combined utilization of the interferometric signals and images obtained can be used in various fields.

According to a first example, the device and the method according to the invention can be implemented in the field of vibrometry.

According to this particular example of implementation, the measurement method according to the invention makes it possible to carry out measurements of vibrations of an object such as a MEMS or a MEMS element, like a membrane or an actuator in the form of an electrostatic comb.

The purpose is to measure the vibrations in the field of view, in-plane (X, Y) and out-of-plane (Z). To this end, according to a preferential embodiment, the device 6000 with two cameras that allow simultaneous acquisitions is implemented.

The interferometric signals are acquired in an off-axis interferometric configuration, and processed according to digital holography techniques as described above. This makes it possible to obtain a complete measurement of the shape of the surface of the object, for each acquisition, and at a high rate. The time sequence of these shapes or profiles allows the displacements or vibrations of the surface to be described, at least out-of-plane (Z). In order to measure high-frequency vibrations, it is possible to use pulsed or stroboscopic lighting.

As explained above, the lateral resolution achievable in the interferometric configuration is limited, and therefore the efficiency of this technique for the in-plane measurements (X, Y) is also limited.

In order to overcome this problem, according to the invention, a parallel acquisition of images with the second camera and the second source is carried out synchronously (for the illumination and the acquisition) with the acquisition of the interferometric signals. Thus, by correlating successive images, it is possible to determine in-plane displacements (X, Y) with high accuracy. As the acquisitions in the two configurations are synchronous, the vibration or the complete displacement of the MEMS can be described or monitored effectively in the field of view, in-plane (X, Y) and out-of-plane (Z).

According to another example, the device and the method according to the invention can be implemented for determining a conjugate object plane.

In fact, in order to carry out profile measurements of a surface or of an interface with an interferometric device, it is necessary for the following two conditions to be satisfied.

Firstly, the surface must be positioned in a conjugate plane of the detector, in the direction of imaging, or close to such a plane so that there is sufficient light reflected by the surface and thus power coupled back into the imaging system to allow a measurement.

Secondly, the optical path difference between the measurement beam reflected by the surface and the reference beam must be less than the coherence length of the light source, to allow the appearance of interference fringes on the detector.

It should be noted that in general terms, it is possible for these two conditions not to be satisfied at the same location or in the same plane, depending on the balance of the interferometer. This is the case in particular when the measurement beam passes through layers of material or refractive surfaces (lenses) before reaching the surface to be measured. It may then be necessary to adjust separately the position of the conjugate object plane and the difference in the optical path between the measurement and reference beams. This also has the result that it is not possible, in general, to use the interference fringes to determine a conjugate object plane, although they have a significant impact on the quality of the interferometric image.

Moreover, when the surface to be measured is not positioned in the conjugate object plane of the detector, the shape measurements produce an incorrect result because they incorporate the effects of propagation of the wave between the conjugate object plane of the detector and the surface. It is therefore necessary to locate this conjugate plane precisely, either positioning the surface of the object precisely in this plane, or by using calculation to propagate the electromagnetic field detected on the detector in the interferometric configuration in the conjugate image plane of the surface to be measured of the object.

According to an embodiment of the method, the measurement device according to the invention is used in the imaging configuration, so as to obtain an image of the surface that is not disturbed by interference fringes, to determine the position of the surface to be measured relative to the conjugate object plane of the detector.

This makes it possible in particular to know the position for which the conjugate object plane of the detector is positioned at the level of the surface to be measured. It is possible to determine this position by analysis of images acquired during scanning, by determining for example the image in which the high spatial frequencies are maximized.

Once this position is known, it is possible for example:
to place the conjugate object plane of the detector at the level of this surface,
optionally, to optimize the visibility of the interference fringes by varying the difference in optical paths between the measurement and reference beams, and
to acquire and process the interference signals in order to deduce therefrom an item of shape information of the surface.

According to an alternative implementation, in particular when an off-axis interferometry technique is used with digital holography processing, it may be preferable to carry out the interferometric measurements with the surface of the object positioned outside the conjugate object plane of the plane of the detector, in particular in order to have slower phase variations.

In this case, the conjugate object plane of the detector is placed at a known distance from the position for which the conjugate object plane of the detector is positioned at the level of the surface to be measured. The visibility of the interference fringes can optionally be optimized by varying the difference in optical paths between the measurement and reference beams. Then, the interference signals are acquired and processed in order to deduce therefrom an electromagnetic field or wavefront expression at the level of the detector. Finally, this electromagnetic field is digitally propagated to the position of the conjugate image plane of the measured surface, by using a known model such as described above, to obtain an item of surface profile information.

Of course, the invention is not limited to the examples that have just been described, and numerous modifications may be made to these examples without exceeding the scope of the invention.

The invention claimed is:

1. A measurement device for measuring a surface of an object, the device comprising:
at least one light source;
an optical sensor or a plurality of optical sensors; and
an interferometric device having a measurement arm and a reference arm, the measurement arm being configured to direct the light coming from the at least one light source towards the surface to be measured of the object via a focusing optical system and to direct the light coming from the surface to be measured towards the or at least one of the optical sensors;
the measurement device being configured, in an interferometry configuration, to illuminate the reference arm and the measurement arm with the at least one light source and to direct the light coming from the measurement arm and from the reference arm towards at least a first optical sensor among the optical sensors, so as to form an interference signal;
the measurement device being configured, in an imaging configuration, to illuminate at least the measurement arm and to direct the light coming from the measurement arm only towards the at least one optical sensor, so as to form an image of the surface to be measured;
the measurement device also comprising-means for determining a position of the surface to be measured relative to a conjugate object plane of the at least first optical sensor, based on a measurement of said surface in the imaging configuration;
digital processing means configured to use said position of the surface to be measured for correcting effects of propagation of the light between the conjugate object plane of the at least first optical sensor and said surface, to produce, based on the interference signal, an item of information on the surface to be measured.

2. The device according to claim 1, the device also comprising toggle means for toggling between the imaging configuration and the interferometry configuration.

3. The device according to claim 2, characterized in that the toggle means comprise a blocking element for blocking the light from the reference arm of the interferometric device.

4. The device according to claim 1, characterized in that the device comprises a first light source arranged for illuminating the measurement arm and the reference arm of the interferometric device.

5. The device according to claim 4, characterized in that the device comprises a second light source arranged for illuminating only the measurement arm of the interferometric device.

6. The device according to claim 5, characterized in that the spectral and/or polarization properties of the light emitted respectively by the first and the second light source are different.

7. The device according to claim 6, characterized in that the device comprises two optical sensors, the first being configured to detect the light from the first light source, and the second being configured to detect the light from the second light source.

8. The device according to claim 1, characterized in that the at least one optical sensor comprises a matrix sensor, monochrome or colour.

9. The device according to claim 1, characterized in that the device also comprises positioning means configured for relative positioning of a conjugate object plane of the at least one optical sensor at the level of the surface to be measured.

10. The device according to claim 1, characterized in that the interferometric device comprises a Michelson interferometer.

11. The device according to claim 1, characterized in that the interferometric device comprises a Mach-Zehnder interferometer.

12. A method for measuring a surface of an object, the method being implemented by a measurement device comprising:
- at least one light source;
- an optical sensor or a plurality of optical sensors;
- an interferometric device having a measurement arm and a reference arm, the measurement arm being configured to direct the light coming from the at least one light source towards the surface to be measured of the object via a focusing optical system and to direct the light coming from the surface to be measured towards the or at least one of the optical sensors;

the method comprising:
- measuring the surface in an interferometry configuration of the device, by lighting the reference arm and the measurement arm with the at least one light source and detecting, by at least a first optical sensor among the optical sensors, the light coming from the measurement arm and from the reference arm, so as to produce an interference signal;
- measuring the surface in an imaging configuration of the device, by lighting at least the measurement arm and detecting, by the at least one optical sensor, the light originating only from the measurement arm, so as to form an image of the surface to be measured; and
- determining a position of the surface to be measured relative to a conjugate object plane of the at least first optical sensor, based on a measurement of said surface in the imaging configuration; and
- processing said position of the surface to be measured for correcting effects of propagation of the light between the conjugate object plane of the at least first optical sensor and said surface, and the interference signal by the digital processing means, so as to obtain an item of information on the surface to be measured.

13. The method according to claim 12, characterized in that the processing of the interference signal is carried out by an analysis using profilometry of a plurality of interferograms acquired for one and the same surface to be measured.

14. The method according to claim 13, characterized in that the plurality of interferograms is acquired according to a phase-shifting interferometric method or according to a vertical scanning interferometric method.

15. The method according to claim 12, characterized in that the processing of the interference signal implements a calculation method using digital holography.

16. The method according to claim 12, characterized in that the method comprises a step of obtaining an item of information on the surface to be measured, combining an item of greyscale and/or colour intensity information obtained in imaging configuration and an item of shape and/or profile information obtained in interferometry configuration.

17. The method according to claim 12, characterized in that the method comprises a step of obtaining an item of information of displacement or of vibration of the surface to be measured, comprising obtaining an item of information of in-plane displacement or of vibration of this surface based on images in imaging configuration, and obtaining an item of information of out-of-plane displacement or vibration of this surface based on interference signals in interferometry configuration.

* * * * *